United States Patent [19]

Kawamura et al.

[11] Patent Number: 5,146,410
[45] Date of Patent: Sep. 8, 1992

[54] SELECTIVELY GROUPED AXES LINEAR INTERPOLATION NUMERICAL CONTROL SYSTEM

[75] Inventors: Hideaki Kawamura, Hachioji; Kentaro Fujibayashi, Musashino; Yosata Hidaka, Tokyo, all of Japan

[73] Assignee: Fanuc Limited, Minamitsuru, Japan

[21] Appl. No.: 747,503

[22] PCT Filed: Oct. 27, 1988

[86] PCT No.: PCT/JP88/01095
§ 371 Date: Jul. 21, 1989
§ 102(e) Date: Jul. 21, 1989

[87] PCT Pub. No.: WO89/05482
PCT Pub. Date: Jun. 15, 1989

Related U.S. Application Data

[63] Continuation of Ser. No. 391,563, Jul. 21, 1989, abandoned.

[30] Foreign Application Priority Data

Dec. 10, 1987 [JP] Japan .................. 62-312480

[51] Int. Cl.[5] .......................................... G05B 19/403
[52] U.S. Cl. .............................. 364/474.31; 318/573; 364/136; 364/474.11
[58] Field of Search ................ 364/131-136, 364/138, 139, 474.11, 474.28, 474.36; 318/574, 575, 573

[56] References Cited

U.S. PATENT DOCUMENTS

| | | | |
|---|---|---|---|
| 4,489,377 | 12/1984 | Mawyer et al. | 364/474.2 |
| 4,513,379 | 4/1985 | Wilson et al. | 364/900 X |
| 4,514,814 | 4/1985 | Evans | 364/138 X |
| 4,891,765 | 1/1990 | Hatori et al. | 364/474.11 X |

Primary Examiner—Joseph Ruggiero
Attorney, Agent, or Firm—Staas & Halsey

[57] ABSTRACT

A computerized numerical control system controls the axes of a computerized numerical control apparatus (20) from a programmable machine controller (10) coupled to the computerized numerical control apparatus (20). Command values for the axes, information with respect to the grouping of the axes, and execution times for the axes in respective groups are sent from the programmable machine controller (10) to the computerized numerical control apparatus (20). When all commands for the axes in the respective groups are received by the computerized numerical control apparatus (20), pulses start to be distributed to the axes, and the pulses are distributed within the execution times. Linear interpolation can be performed on any desired combination of axes of the computerized numerical control apparatus (20) for preventing physical interference which could otherwise occur between axes when an automatic tool changing (ATC) mode is controlled by the programmable machine controller (10).

1 Claim, 2 Drawing Sheets

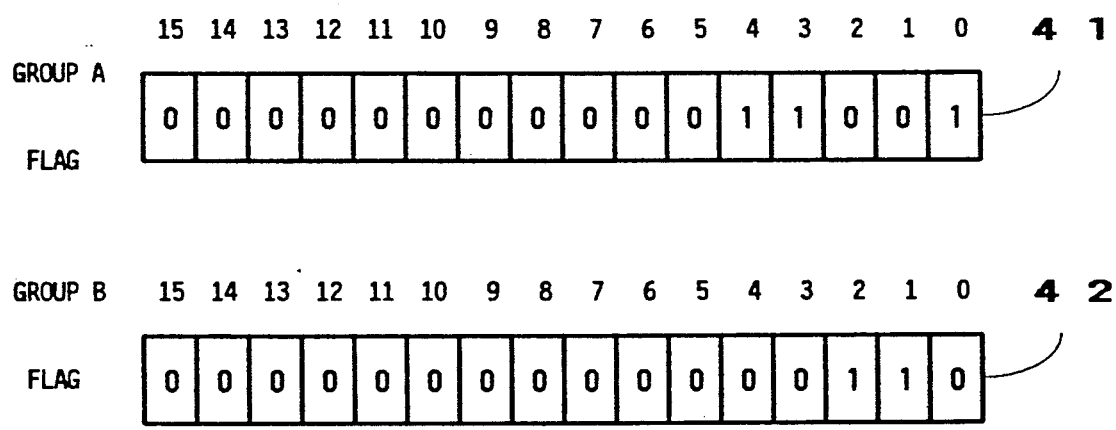
F I G. 2

SELECTIVELY GROUPED AXES LINEAR INTERPOLATION NUMERICAL CONTROL SYSTEM

CROSS REFERENCE TO RELATED APPLICATION

This application is related to copending U.S. patent application having U.S. Ser. No. 07/391,562 that is assigned to the same assignee as the present application now abandoned.

1. Technical Field

The present invention relates to a computerized numerical control (CNC) system for controlling the axes of a computerized numerical control apparatus from a programmable machine controller (PMC) coupled to the computerized numerical control apparatus, and more particularly to a computerized numerical control system for controlling the axes of the computerized numerical control apparatus through linear interpolation.

2. Background Art

There are widely used systems for controlling machines with computerized numerical control (CNC) apparatus to which programmable machine controllers (PMC) are coupled. The axes of a computerized numerical control apparatus are controlled from a programmable machine controller by command signals applied through a common RAM. With this arrangement, the axes of the CNC apparatus can be controlled by a user program stored in the PMC.

However, command signals from the PMC are applied respectively for the individual axes, and hence these axes of the CNC apparatus can only be controlled asynchronously. There is no information regarding the grouping of the axes, etc. Therefore, it has heretofore been unable to operate the axes of the CNC apparatus in relation to each other.

SUMMARY OF THE INVENTION

It is an object of the present invention to provide a computerized numerical control system which will solve the aforesaid problems of the conventional computerized numerical control methods, and which controls the axes of a computerized numerical control apparatus through linear interpolation with command signals from a programmable machine controller.

To solve the above problems, there is provided in accordance with the present invention a computerized numerical control system for controlling the axes of a computerized numerical control apparatus from a programmable machine controller coupled to the computerized numerical control apparatus, the computerized numerical control system comprising: means for sending command values for the axes, information with respect to the grouping of the axes, and execution times for the axes in respective groups, from the programmable machine controller to the computerized numerical control apparatus; and means for starting to distribute pulses to axes when all commands for the axes in the respective groups are received by the computerized numerical control apparatus, and for distributing the pulses within the execution times to effect linear interpolation with respect to the axes.

The axes in the groups are caused to start simultaneously moving in response to the information with respect to the grouping of the axes sent from the programmable machine controller. Furthermore, the execution times are given to the axes in the groups, and the pulses are distributed within the execution times for effecting linear interpolation with respect to the axes of the computerized numerical control apparatus.

BRIEF DESCRIPTION OF THE DRAWINGS

FIG. 2 is a diagram illustrating the grouping of axes.

DESCRIPTION OF THE PREFERRED EMBODIMENTS

Figure 1:
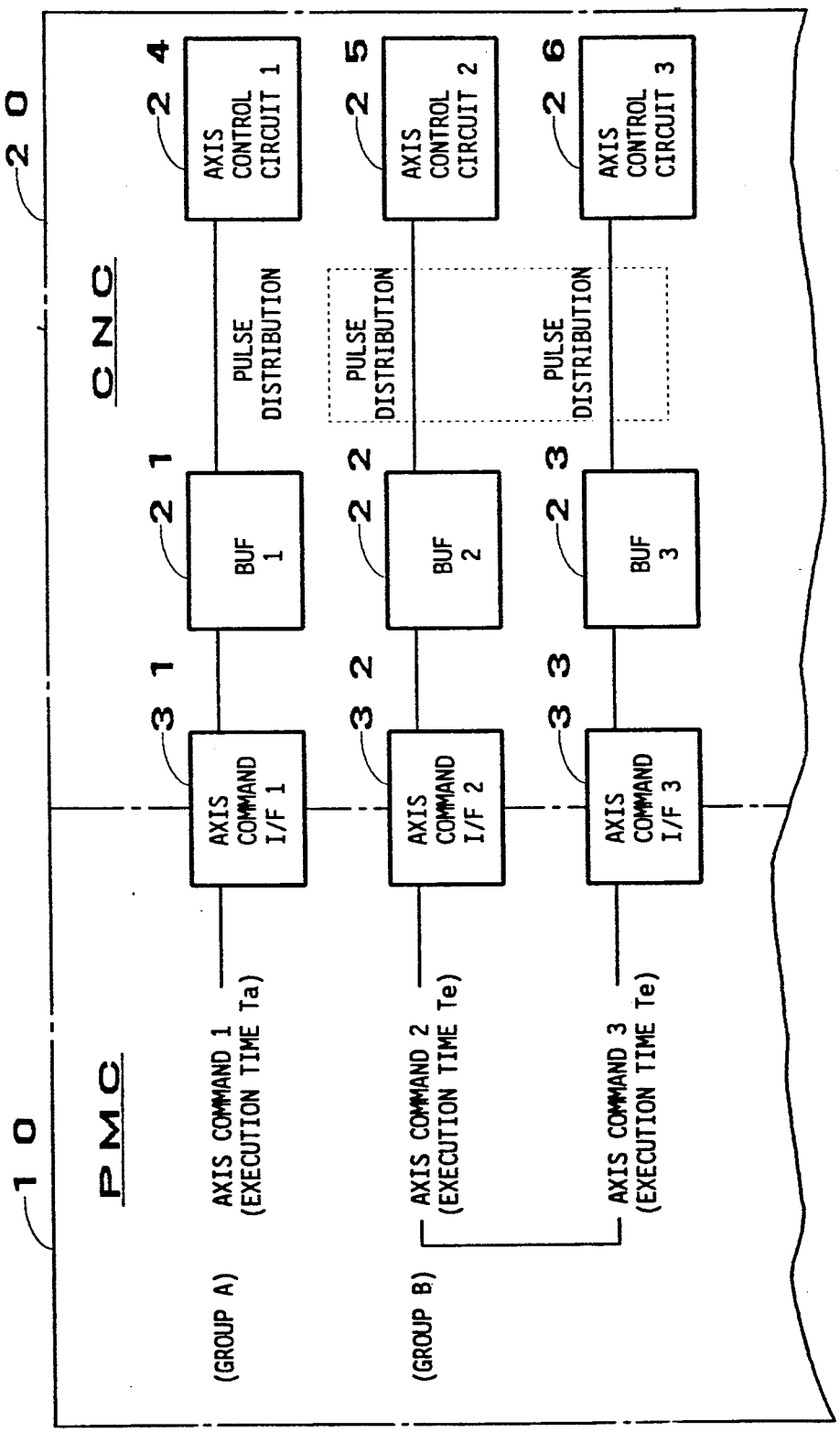
FIG. 1 is a block diagram of a computerized numerical control system according to an embodiment of the present invention.

An embodiment of the present invention will hereinafter be described with reference to the drawings.

FIG. 1 shows in block form a computerized numerical control system according to an embodiment of the present invention. A programmable machine controller (PMC) 10 is coupled to a computerized numerical control (CNC) apparatus 20 and issues command signals for controlling three axes of the CNC apparatus 20.

Moving commands are sent from the PMC 10 to axis command interfaces 31, 32, 33 through a common RAM. Command values and execution times from the PMC 10 are temporarily stored in buffers 21, 22, 23. Axis control circuits 24, 25, 26 are responsive to commands from the buffers 21, 22, 23 for controlling servomotors or the like (not shown).

In FIG. 1, a first axis belongs to a group A, and second and third axes to a group B. Command values for the second and third axes are stored in the buffers 22, 23 and simultaneously start to be distributed for enabling the second and third axes to start moving at the same time. The first axis of the group A is given an execution time Ta, whereas the second and third axes of the group B are given an execution time Te. Therefore, since the second and third axes of the group B execute commanded motions during the given time Te, linear interpolation is effected with respect to the second and third axes.

The grouping of the axes or the execution times can be varied according to commands from the PMC 10. Consequently, linear interpolation can be performed on any desired combination of axes of the CNC apparatus 20.

FIG. 2 illustrates the grouping of the axes. The group A is indicated by a flag 41, and the group B is indicated by a flag 42. The 0th bit position in each of the flags 41, 42 represents the first axis of the CNC apparatus 20. In the 0th bit position, a "1" bit is placed in the flag 41 for the group A, and hence the first axis is assigned to the group A. The 1st bit position represents the second axis of the CNC apparatus. In the 1st bit position, a "1" bit is placed in the flag 42 for the group B, and hence the second axis is assigned to the group B. The 2nd bit position indicates the third axis of the CNC apparatus 20. The third axis is assigned to the group B since a "1" bit is placed in the 2nd bit position in the flag 42.

Therefore, the first axis of the CNC apparatus 20 belongs to the group A, whereas the second and third axes thereof belong to the group B, with linear interpolation effected on the second and third axes.

The CNC apparatus has been described as having three axes. However, any desired number of axes may be commanded similarly. Moreover, it is also possible to effect linear interpolation for three or more axes. While flags have been used for grouping the axes in the illustrated embodiment, other means such as for directly specifying groups for the axes may be employed.

With the present invention, as described above, moving commands, grouping information, and execution times for the axes are commanded from the PMC to the CNC apparatus for effecting linear interpolation with respect to axes of the CNC apparatus, so that linear interpolation may be performed on any desired combination of axes of the CNC apparatus. Thus, physical interference which could otherwise occur between axes when an automatic tool changing (ATC) mode is controlled by the PMC can reliably be prevented from taking place.

We claim:

1. A computerized numerical control system for controlling selected groups of axes of a computerized numerical control apparatus from a programmable machine controller coupled to the computerized numerical control apparatus, said computerized numerical control system comprising:

means, positioned in the programmable machine controller, for sending moving commands including corresponding command values and execution times specifying various ones of the axes as being in respective ones of the groups and for specifying the execution times for the axes in the respective groups, from the programmable machine controller to the computerized numerical control apparatus, and means, positioned in the computerized numerical control apparatus, for distributing pulses to the axes when all moving commands for the axes in the respective groups are received by the computerized numerical control apparatus and for distributing the pulses within said execution times to effect linear interpolation with respect to said axes.

* * * * *